(12) United States Patent
Alaze

(10) Patent No.: US 6,267,569 B1
(45) Date of Patent: Jul. 31, 2001

(54) PISTON PUMP

(75) Inventor: Norbert Alaze, Markgroningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,850

(22) PCT Filed: Mar. 30, 1999

(86) PCT No.: PCT/DE99/00696

§ 371 Date: May 15, 2000

§ 102(e) Date: May 15, 2000

(87) PCT Pub. No.: WO99/66206

PCT Pub. Date: Dec. 23, 1999

(30) Foreign Application Priority Data

Jun. 17, 1998 (DE) .............................................. 198 26 913
Oct. 15, 1998 (DE) .............................................. 198 47 470

(51) Int. Cl.[7] .................................................... F04B 53/20
(52) U.S. Cl. ......................... 417/470; 417/549; 92/171.1
(58) Field of Search ................................... 417/470, 549, 417/554; 92/171.1

(56) References Cited

U.S. PATENT DOCUMENTS

| 3,773,441 | * | 11/1973 | Scherta ................................. 417/554 |
| 5,335,984 | * | 8/1994 | Alaze et al. ....................... 303/119.2 |
| 6,082,244 | * | 7/2000 | Siegel et al. ............................. 92/78 |
| 6,109,896 | * | 8/2000 | Schuller et al. ..................... 417/549 |
| 6,161,466 | * | 12/2000 | Schuller et al. ................. 414/544 X |
| 6,171,083 | * | 1/2001 | Schuller ............................... 417/549 |

* cited by examiner

Primary Examiner—Timothy S. Thorpe
Assistant Examiner—David J. Torrente
(74) Attorney, Agent, or Firm—Ronald E. Greigg; Edwin E. Greigg

(57) ABSTRACT

The invention relates to a piston pump, in particular for an antilock and slip-controlled vehicle brake system. In order to embody a filter, the invention proposes providing a bushing of the piston pump with a bushing that encompasses it, wherein the bushing has beads on its ends, which are provided with grooves after the fashion of a knurling, through which incoming brake fluid flows between a wall of a pump bore and the bead into the piston pump and is therefore filtered.

20 Claims, 2 Drawing Sheets

PISTON PUMP

PRIOR ART

The invention relates to a piston pump for a vehicle brake system according to the preamble to the main claim.

Piston pumps of this kind are known, for example, as return feed pumps for antilock and/or traction controlled hydraulic vehicle brake systems. For example, reference is made to the piston pump disclosed by DE 41 07 979 A1. The known piston pump has a pump housing with a pump bore which encloses a piston so that it can move axially. The piston can be driven into an axially reciprocating stroke motion in the pump bore by means of a cam drive. The piston can be guided directly in the pump bore of the pump housing or, as in the known piston pump, can be guided in a bushing inserted into the pump bore. Furthermore, it is known to provide a filter for filtering fluid that is supplied by the piston pump.

ADVANTAGES OF THE INVENTION

The piston pump according to the invention, which has the features of the main claim, has a filter with a rough counter surface that rests against a surface that is smooth, for example, or is likewise rough. As a result of the rough surface resting against the counter surface, channels are formed that are small in cross section, through which the fluid to be supplied is conveyed and thereby filtered. The roughness of the surface is selected so that the channels formed have a cross section that corresponds to the size of through openings of filters for piston pumps of this kind. The invention has the advantage that the filter can be easily and inexpensively produced.

Advantageous embodiments and improvements of the invention disclosed in the main claim are the subject of the dependent claims.

For example, the rough surface can have nubs or a fluting, it can be manufactured as a knurling or so that it resembles a knurling (claim 2), wherein with a fluting or the like, attention must be paid that the fluting is not embodied extending lateral to the through flow direction of the fluid to be supplied so that the fluid is permitted to flow through.

In one embodiment of the invention, the filter is disposed in the pump bore and the rough surface is formed so that it is complementary to the wall of the pump bore, wherein the wall of the pump bore constitutes the counter surface against which the rough surface rests (claim 3). Complementary means that the rough surface and the wall of the pump bore have the same curvature. This embodiment of the invention has the advantage that the filter is accommodated in a space-saving manner in the pump bore and that the piston pump can be embodied as short in structure.

In an improvement according to claim 4, the piston pump has a bushing whose outer circumference surface is rough at least on a part of the total surface area, and rests against the wall of the pump bore that constitutes the counter surface. This embodiment has the advantage that no separate parts are necessary; in particular, the production and installation of a filter are no longer necessary.

Conversely, it is also possible to embody the wall of the pump bore as rough, at least on a part of the total surface area, wherein the bushing resting against the wall of the pump bore constitutes the counter surface (claim 7). The outer circumference surface of the bushing can be smooth or likewise rough in this embodiment of the invention.

The piston pump according to the invention is particularly provided as a pump in a brake system of a vehicle and is used when controlling the pressure in wheel brake cylinders. The abbreviations ABS, TCS, ESP, or EHB are used for such brake systems, depending on the type of brake system involved. In the brake system, the pump serves for example to return brake fluid from one or a number of wheel brake cylinders to a master cylinder (ABS) and/or to supply brake fluid from a storage tank into one or a number of wheel brake cylinders (TCS, ESP, or EHB). The pump is required, for example, in a brake system with wheel slip control (ABS or TCS) and/or a brake system serving as a steering aid (ESP) and/or an electrohydraulic brake system (EHB). With wheel slip control (ABS or TCS), for example a locking of the wheels of the vehicle during a braking maneuver can be prevented when there is strong pressure on the brake pedal (ABS) and/or a spinning of the driven wheels of the vehicle can be prevented when there is strong pressure on the gas pedal (TCS). In a brake system that serves as a steering aid (ESP), a brake pressure is built up in one or more wheel brake cylinders independently of an actuation of the brake pedal or gas pedal, for example in order to prevent the vehicle from breaking out of the track desired by the driver. The pump can also be used in an electrohydraulic brake system (EHB) in which the pump supplies the brake fluid into the wheel brake cylinder or cylinders if an electric brake pedal sensor detects an actuation of the brake pedal or in which the pump is used to fill a reservoir of the brake system.

BRIEF DESCRIPTION OF THE DRAWINGS

The invention will be explained in detail below in conjunction with a selected exemplary embodiment shown in the drawing.

DESCRIPTION OF THE EXEMPLARY EMBODIMENT

Figure 1:
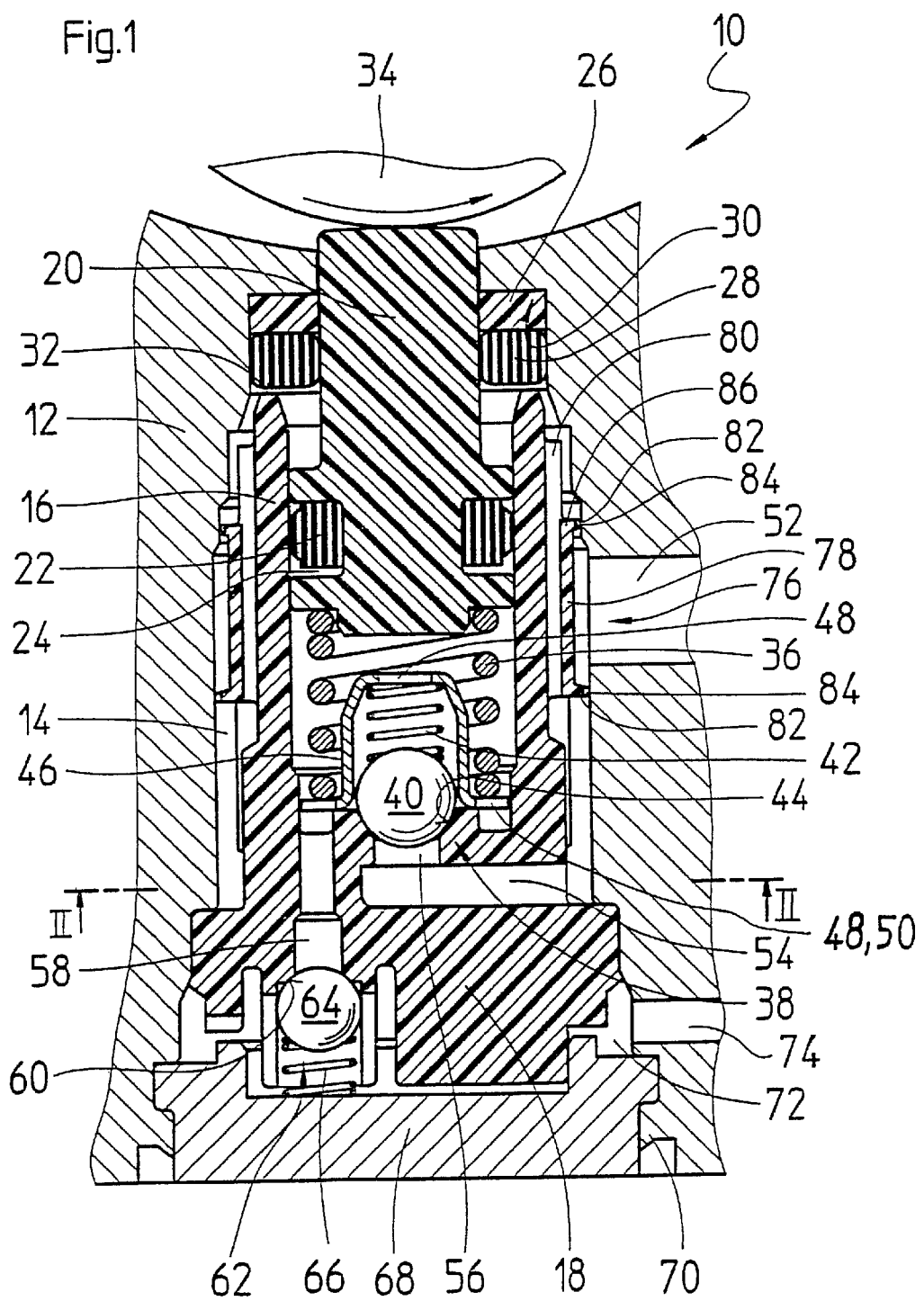
FIG. 1 shows a 90°-angled axial section through a piston pump according to the invention along line I—I in FIG. 2.

The piston pump according to the invention, which is shown in the drawing and is labeled as a whole with the reference numeral 10, has a pump housing 12 with a straight, stepped pump bore 14. The pump housing 12 is comprised of metal, in particular of pressure cast aluminum. The pump housing 12 is part of a hydraulic block, otherwise not shown, of an antilock and traction controlled vehicle brake system. In addition to the piston pump 10, other hydraulic components such as solenoid valves, damper chambers, and hydraulic accumulators are inserted into the hydraulic block and are hydraulically connected to each other and to the piston pump 10. For the sake of clear depiction, only a fraction of the hydraulic block that encompasses the piston pump 10 is shown in the drawings.

The pump bore 14 has a bushing 16 inserted into it, which is manufactured out of plastic as an injection molded part and has a bushing bottom 18 that is of one piece with it. A piston 20 made of plastic is contained in the bushing 16 so that it can slide axially. On an end disposed against the bushing 16, the piston 20 is sealed in the bushing 16 with a sealing ring 22 that is inserted into a piston groove 24. On an end protruding from the bushing 16, the piston 20 is guided with a plastic guide ring 26 in the pump bore 14 and is sealed in the pump bore 14 with a sealing ring 28. The guide ring 26 and the sealing ring 28 are inserted resting against each other into a step 30 of the pump bore 14 and are secured in the step 30 of the pump bore 14 by an end edge 32 of the bushing 16 oriented toward them. The piston 20 is embodied as a stepped piston, i.e. it is inserted and sealed in the bushing 16 on a greater diameter than at its end protruding from the bushing 16. Instead of the stepped piston 20, a simple piston can also be used which is guided and sealed on the same diameter at both of its ends (not shown).

In order to drive the piston 20 into an axial reciprocating stroke motion in the pump bore 14 and the bushing 16, the piston pump 10 has a cam, which can be driven to rotate by an electric motor, on the end of the piston 20 protruding from the bushing 16, and the piston 20 is pressed against the circumference of this cam by a piston restoring spring 36 embodied as a helical compression spring, which is inserted into the bushing 16 between the bushing bottom 18 and the piston 20.

As an inlet valve 38, the piston pump 10 according to the invention has a spring-loaded check valve with a valve ball 40 as a valve closing body. The valve ball 40 is pressed against a conical valve seat 44 embodied centrally in the bushing bottom 18 by a valve closing spring 42 embodied as a helical compression spring. The valve closing spring 42 is supported against a valve cage 46, which is provided with through flow openings 48 for the brake fluid that is to be supplied by the piston pump 10. The valve cage 46 is produced as a stamped and deep-drawn part made of sheet metal. It has an annular disk-shaped spring plate 50 which protrudes radially outward, which the piston restoring spring 36 rests against and with which the piston restoring spring 36 presses the valve cage 46 against the bushing bottom 18. The piston restoring spring 36 is embodied as considerably stronger than the valve closing spring 42 of the inlet valve 38 so that it reliably holds the valve cage 46 in contact with the bushing bottom 18 counter to the force of the valve closing spring 42 under all loads that occur during operation of the piston pump 10.

Figure 2:
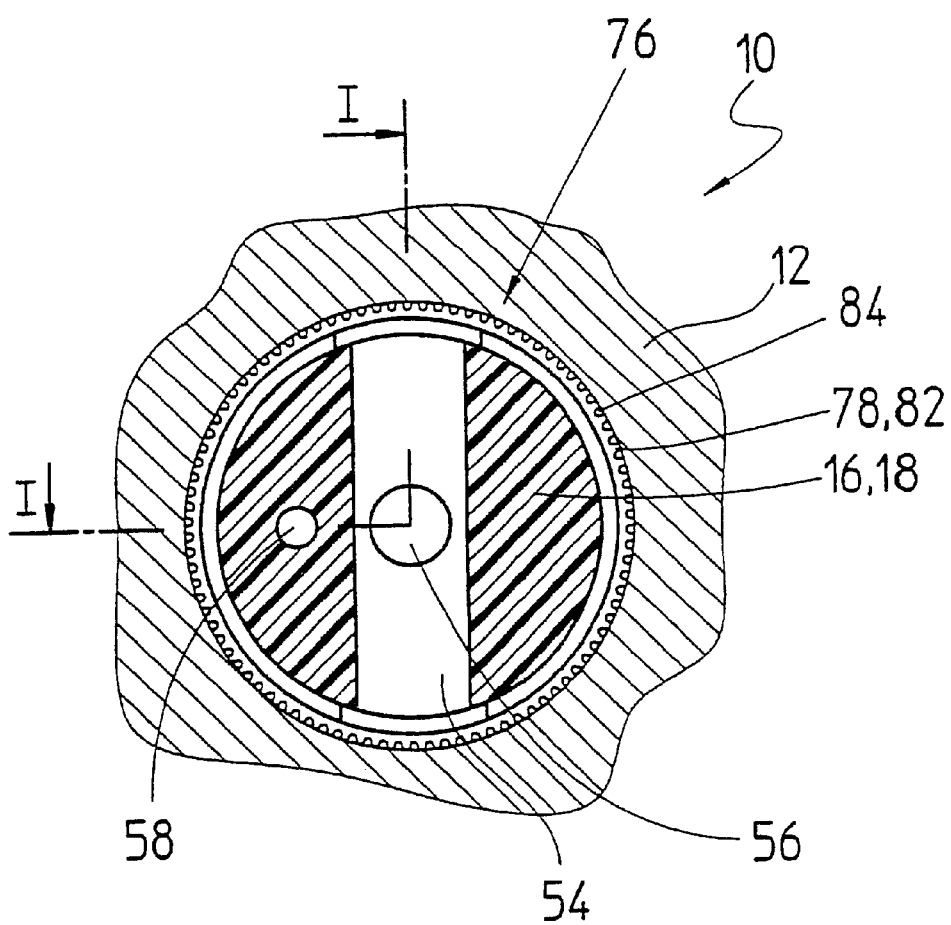
FIG. 2 shows a cross section through the piston pump along line II—II in FIG. 1.

The valve cage 46, which encloses the valve closing spring 42 and the valve ball 40 of the inlet valve 38, is disposed on the side of the bushing bottom 18 oriented toward the piston 20, i.e. on the inside of the bushing 16. An inflow of brake fluid takes place by means of an inlet bore 52 in the pump housing 12, which feeds radially into the pump bore 14 and also, by means of a cross-sectionally annular intermediary space between the bushing 16 and the pump bore 14, feeds into a cross conduit 54 which passes laterally through the bushing bottom 18. Due to the angled sectional depiction in FIG. 1, the cross conduit 54 appears to end in the middle of the bushing bottom 18; in actual fact, the cross conduit 54 passes laterally through the bushing bottom 18 as shown in FIG. 2. The cross conduit 54 is disposed on an end of the inlet valve 38 remote from the piston 20. The cross conduit 54 has a short central bore 56 leading from it to the inlet valve 38, which transitions into its valve seat 44.

An outflow takes place by means of an outlet bore 58, which passes laterally through the bushing bottom 18 next to the cross conduit 54 and axially parallel to the bushing 16 (FIG. 2). The outlet bore 58 feeds with a valve seat 60 of an outlet valve 62, which is embodied as a spring-loaded check valve. The outlet valve 62 has a valve ball 64 as the valve closing body, which is pressed against the valve seat 60 by a valve closing spring 66 embodied as a helical compression spring.

The valve closing spring 66 is supported against a sealing cap 68, which seals the pump bore 14 on an end remote from the cam element 34. The sealing cap 68 is secured and sealed in a pressure-tight manner by means of a circumferential caulking 70 of the pump housing 12.

By means of an annular conduit 72 between the pump housing 12 and the bushing bottom 18, brake fluid which has flowed from the piston pump 10 by means of the outlet valve 62 travels into an outlet bore 74 which is let into the pump housing 12 radial to the pump bore 14.

The piston pump 10 according to the invention has a filter 76 which is disposed in the inlet of the piston pump 10. The filter 76 has a bushing 78 which is disposed at the level of the inlet bore 52 and encompasses the bushing 16. The bushing 78 is provided with longitudinal ribs 80 that are of one piece with the bushing 16 and the longitudinal ribs 80 hold the bushing 78 spaced radially apart from the bushing 16. On each of its two end faces, the bushing 78 has an outwardly protruding bead 82, which rests with its circumference against a wall of the pump bore 14. The circumference of the bead 82 is embodied as rough so that brake fluid flowing into the piston pump 10 at the circumference of this bead 82 can flow between this bead and the wall of the pump bore 14. Since the through flow cross sections between the rough circumference of the beads 82 and the wall of the pump bore 14 are small, the brake fluid flowing into the piston pump 10 is filtered as it flows through between the bead 82 and the wall of the pump bore 14.

In the exemplary embodiment, the roughness of the circumference of the beads 82 is constituted by means of small cross section grooves 84 that pass axially through the bead 82 (FIG. 2). The grooves 84, which are produced by means of the injection molding of the bushing 16 give the circumference of the beads 82 the appearance of being knurled.

Brake fluid flowing in through the inlet bore 52 of the piston pump 10 first travels on the outside of the bushing 78 of the filter 76, where the flow is divided and deflected to the beads 82 at both ends of the bushing 78. At the ends of the bushing 78, the brake fluid flows through the grooves 84 on the circumference of the beads 82 and is thereby filtered. The part of brake fluid which flows through the grooves 84 of the bead 82 oriented toward the cam 34 is deflected 180° by an end edge 86 of the bushing 78 and flows through between the inside of the bushing 78 and the outside of the bushing 16 to the other end of the bushing 78 where this part of the brake fluid is united with the other part of brake fluid which flows through the grooves 84 of the other bead 82 and from there, flows on the outside of the bushing 16 in the pump bore 14, traveling on into the cross conduit 54 in the bushing bottom 18.

The foregoing relates to the preferred exemplary embodiments of the invention, it being understood that other variants and embodiments thereof are possible within the spirit and scope of the invention, the latter being defined by the appended claims.

What is claimed is:

1. A piston pump for a vehicle brake system, having a pump housing provided with a pump bore, which bore encloses a piston for movement axially, which piston can be driven into a reciprocating stroke motion, said piston pump further having a filter for a fluid to be supplied, said filter (76) having a rough surface portion (84), which surface portion rests against a counter surface, and the fluid to be supplied is conveyed between the rough surface portion (84) and the counter surface.

2. The piston pump according to claim 1, wherein the rough surface portion (84) is embodied in the form of a knurling.

3. The piston pump according to claim 1, wherein the filter (76) is disposed in the pump bore (14) and the rough surface portion (84) has a shape that is complementary to a wall of the pump bore (14), and further wherein the wall of the pump bore (14) constitutes the counter surface against which the rough surface portion (84) rests.

4. The piston pump according to claim 2, wherein the filter (76) is disposed in the pump bore (14) and the rough surface portion (84) has a shape that is complementary to a wall of the pump bore (14), and further wherein the wall of the pump bore (14) constitutes the counter surface against which the rough surface portion (84) rests.

5. The piston pump according to claim 1, wherein the piston pump (10) has a bushing (16), which is inserted into the pump bore (14) and encloses the piston (20) so that the piston can move axially, and at least one part of the outer surface (82) of the bushing (16) is roughened, and further wherein the roughened part of the outer surface (82) of bushing (16) constitutes the rough surface portion (84) with which the bushing (16) rests against the wall of the pump bore (14).

6. The piston pump according to claim 2, wherein the piston pump (10) has a bushing (16), which is inserted into the pump bore (14) and encloses the piston (20) so that the piston can move axially, and at least one part of the outer surface (82) of the bushing (16) is roughened, and further wherein the roughened part of the outer surface (82) of bushing (16) constitutes the rough surface portion (84) with which the bushing (16) rests against the wall of the pump bore (14).

7. The piston pump according to claim 3, wherein the piston pump (10) has a bushing (16), which is inserted into the pump bore (14) and encloses the piston (20) so that the piston can move axially, and at least one part of the outer surface (82) of the bushing (16) is roughened, and further wherein the roughened part of the outer surface (82) of bushing (16) constitutes the rough surface portion (84) with which the bushing (16) rests against the wall of the pump bore (14).

8. The piston pump according to claim 5, wherein the outer surface of the bushing (16) is roughened on a circumferential, axially limited section.

9. The piston pump according to claim 6, wherein the outer surface of the bushing (16) is roughened on a circumferential, axially limited section.

10. The piston pump according to claim 7, wherein the outer surface of the bushing (16) is roughened on a circumferential, axially limited section.

11. The piston pump according to claim 8, wherein the bushing (16) has a circumferential bead (82) that protrudes radially outward, whose circumferential surface is roughened and constitutes the rough surface portion (84), and said bead rests against the wall of the pump bore (14).

12. The piston pump according to claim 9, wherein the bushing (16) has a circumferential bead (82) that protrudes radially outward, whose circumferential surface is roughened and constitutes the rough surface portion (84), and said bead rests against the wall of the pump bore (14).

13. The piston pump according to claim 10, wherein the bushing (16) has a circumferential bead (82) that protrudes radially outward, whose circumferential surface is roughened and constitutes the rough surface portion (84), and said bead rests against the wall of the pump bore (14).

14. The piston pump according to claim 1, wherein the piston pump (10) has a bushing (16), which is inserted into the pump bore (14) and encloses the piston (20) so that the piston can move axially, at least one part of the wall of the pump bore (14) is roughened, and further wherein the roughened part of the pump bore (14) comprises the rough surface against which the bushing (16) rests with its outer surface to constitute the counter surface.

15. The piston pump according to claim 2, wherein the piston pump (10) has a bushing (16), which is inserted into the pump bore (14) and encloses the piston (20) so that the piston can move axially, at least one part of the wall of the pump bore (14) is roughened, and further wherein the roughened part of the pump bore (14) comprises the rough surface against which the bushing (16) rests with its outer surface to constitute the counter surface.

16. The piston pump according to claim 3, wherein the piston pump (10) has a bushing (16), which is inserted into the pump bore (14) and encloses the piston (20) so that the piston can move axially, at least one part of the wall of the pump bore (14) is roughened, and further wherein the roughened part of the pump bore (14) comprises the rough surface against which the bushing (16) rests with its outer surface to constitute the counter surface.

17. The piston pump according to claim 5, wherein the piston pump (10) has a bushing (16), which is inserted into the pump bore (14) and encloses the piston (20) so that the piston can move axially, at least one part of the wall of the pump bore (14) is roughened, and further wherein the roughened part of the pump bore (14) comprises the rough surface against which the bushing (16) rests with its outer surface to constitute the counter surface.

18. The piston pump according to claim 8, wherein the piston pump (10) has a bushing (16), which is inserted into the pump bore (14) and encloses the piston (20) so that the piston can move axially, at least one part of the wall of the pump bore (14) is roughened, and further wherein the roughened part of the pump bore (14) comprises the rough surface against which the bushing (16) rests with its outer surface to constitute the counter surface.

19. The piston pump according to claim 11, wherein the piston pump (10) has a bushing (16), which is inserted into the pump bore (14) and encloses the piston (20) so that the piston can move axially, at least one part of the wall of the pump bore (14) is roughened, and further wherein the roughened part of the pump bore (14) comprises the rough surface against which the bushing (16) rests with its outer surface to constitute the counter surface.

20. The piston pump according to claim 14, wherein the wall of the pump bore (14) is roughened on a circumferential, axially limited section.

* * * * *

UNITED STATES PATENT AND TRADEMARK OFFICE
CERTIFICATE OF CORRECTION

PATENT NO. : 6,267,569 B1  
DATED : July 31, 2001  
INVENTOR(S) : Norbert Alaze

Page 1 of 1

It is certified that error appears in the above-identified patent and that said Letters Patent is hereby corrected as shown below:

<u>Title page,</u>  
Item [86], should read as follows:  
[86] PCT NO.: PCT/DE99/00969

Signed and Sealed this

Fifth Day of February, 2002

Attest:

JAMES E. ROGAN  
*Director of the United States Patent and Trademark Office*

*Attesting Officer*